United States Patent [19]
Crane et al.

[11] Patent Number: 5,308,675
[45] Date of Patent: May 3, 1994

[54] FLEXIBLE HIGH DAMPING STRUCTURE

[75] Inventors: Roger M. Crane, Arnold; Paul A. Coffin, Chesapeake Beach, both of Md.

[73] Assignee: The United States of America as represented by the Secretary of the Navy, Washington, D.C.

[21] Appl. No.: 945,041

[22] Filed: Sep. 15, 1992

[51] Int. Cl.$^5$ .......................... B32B 7/00; B32B 7/02; E04C 3/29

[52] U.S. Cl. .................................. 428/120; 428/119; 181/208; 267/141.1; 267/294; 248/638; 248/634; 52/727; 52/728; 52/729; 52/731.7

[58] Field of Search ............... 248/638, 634; 428/119, 428/120; 267/141.1, 294; 52/727, 728, 729, 732, 731.7; 181/208

[56] References Cited

U.S. PATENT DOCUMENTS 4,953,658  9/1990  Goto ................................... 181/208
4,954,377  9/1990  Fischer et al. ...................... 428/36.1

Primary Examiner—Alexander S. Thomas
Attorney, Agent, or Firm—Charles D. Miller; Howard Kaiser

[57] ABSTRACT

A load bearing structural support for machinery which provides a mechanism for dissipating both mechanical and vibrational energy comprises a high damping flexible reinforcement of fiber preform infiltrated with a viscoelastic material which has a high elongation to failure property and provides a significant damping ability. In one embodiment, an I-Beam is formed by a pair of L-shapes and a T-shape. The two L-shapes are placed back to back, with the T-shape placed therebetween forming an I-beam. At least one flexible reinforcement is then positioned between the vertical segments of the T-shape and the two L-shapes to isolate the T-shape. The T-shape is actually "floating" between the L-shapes. In another embodiment, the flexible reinforcement is suspended between at least a pair of spaced anchors with a vertical support of the same flexible reinforcement attached to or integral with the suspended flexible reinforcement portion and its free end anchored to a stable base.

27 Claims, 6 Drawing Sheets

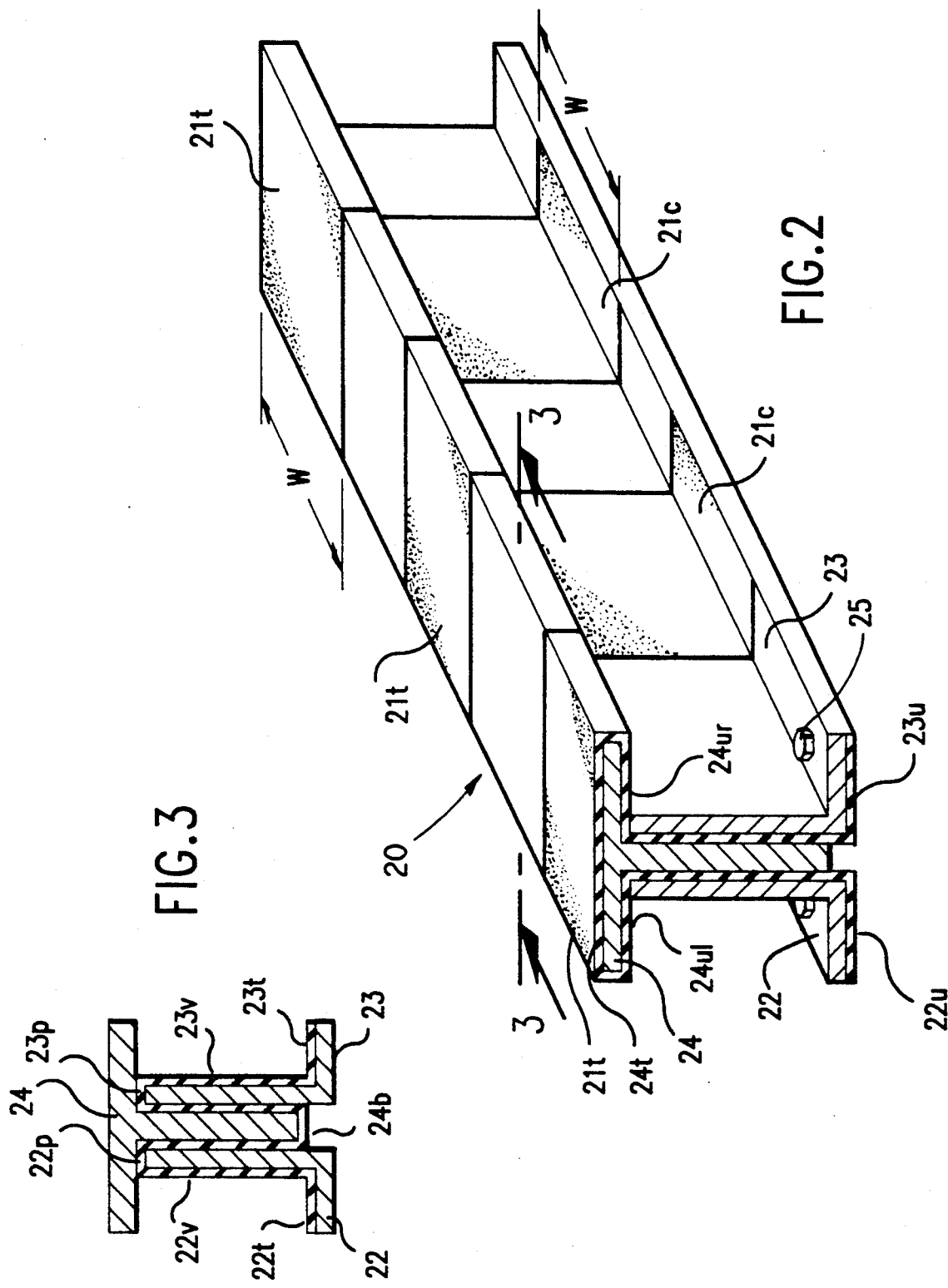

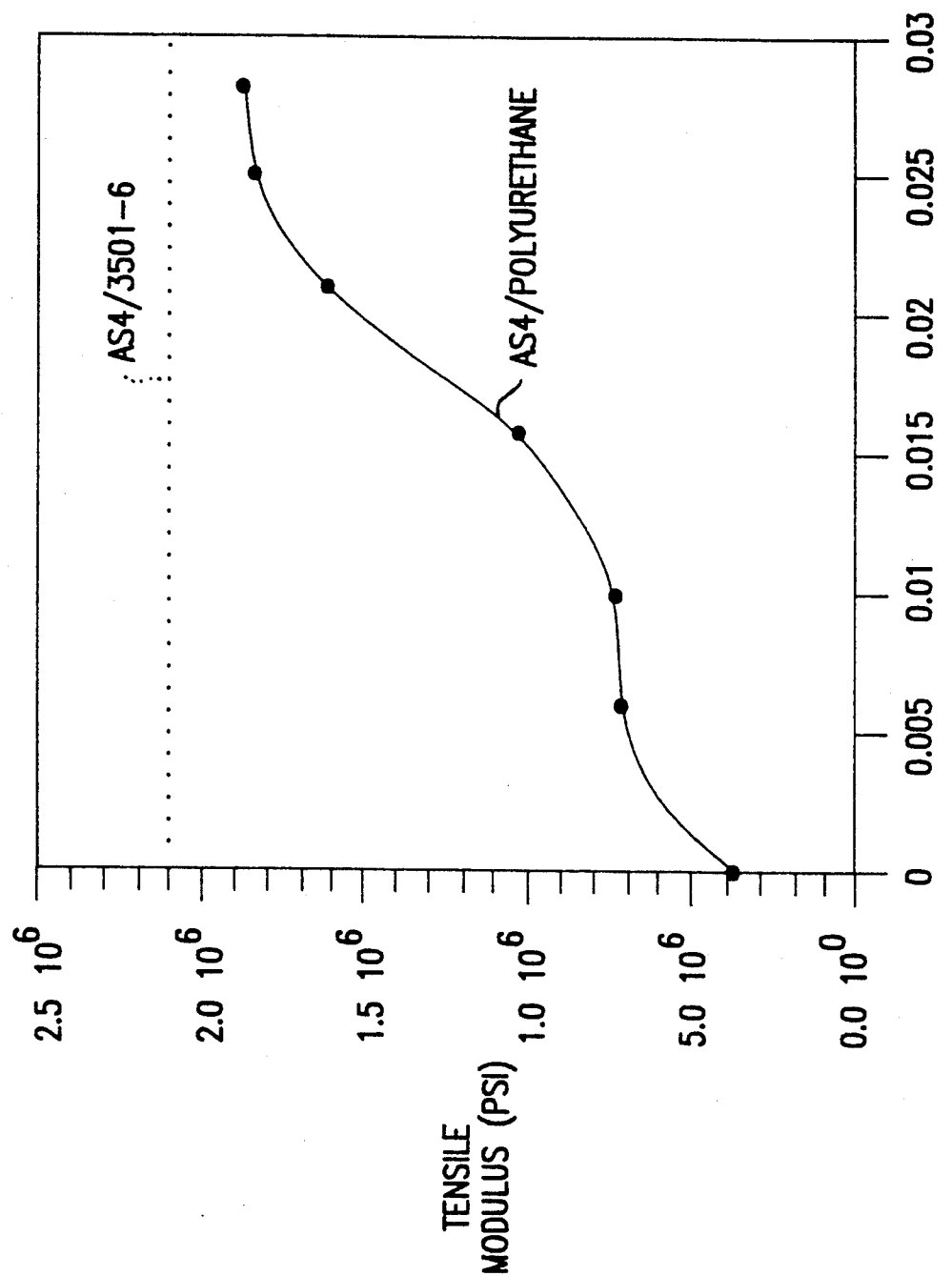

FLEXIBLE HIGH DAMPING STRUCTURE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

This invention relates to a load bearing structural support for machinery, in particular for damping vibration and shock.

2. Description of the Prior Art

Machinery and the like having rotating and/or cyclically moving components generally cause vibration and fatigue problems resulting from the vibration. Many different types of vibration damping devices have been contemplated in the past to reduce unwanted transmission of vibration. Typical devices for reducing vibration include rubber isolation mounts and the like mounted directly under machinery.

Rubber isolation mounts and the like, due to their material characteristics and the structural arrangement, can only support relatively small loads which limit their utility to small machinery such as pumps and small motors. Since the rubber isolation mounts can only support relatively small loads, other supports must be contemplated for heavy machinery.

Constraining layer damping devices, for example, as shown in FIG. 1, consisting of a layer of viscoelastic material 10, such as rubber, sandwiched between a thick, rigid structural base plate 11 and a stiff constraining layer 12 have been contemplated in the past to reduce vibration where the structural load from machinery 13 is significant or aero/hydro-dynamic surfaces, such as for a propeller blade, are required. The viscoelastic material 10 is bonded to the base plate 11 and the constraining layer 12 is bonded to the viscoelastic material 10. In this type of arrangement, when the support is set into vibration, bending occurs. By virtue of the difference in the stiffnesses between the viscoelastic material and the base plate and the constraining layer, significant shear occurs in the viscoelastic material. It is this shear of the viscoelastic material that dissipates the mechanical vibration.

The constraining layer damping devices, however, have a drawback, in that, the bond line between the viscoelastic material and the base plate and the constraining layer must be constantly maintained in order for the damping to occur. Over a period of use, due to vibration and heat generated by machinery, the bond line will degrade, and therefore the damping provided by this configuration will become inadequate.

U.S. Pat. No. 4,954,377 issued to Fischer, et al., discloses a load damper for service in tensile, compression and torsion as a shock and vibration isolation mounting device. The load damper in U.S. Pat. No. 4,954,377, however, is constructed of a multidimensionally braided textile and a viscoelastic material disposed in the interstrand spaces of the textile. The disclosure of the construction of the multidimensionally braided textile with viscoelastic material described in U.S. Pat. No. 4,954,377 is incorporated herein by reference. Multidimensionally braided or weaved textile is also well known in the trade of producing rigid composites using epoxy, fiberglass and the like, for example, described in Report DTNSRDC/SME-84-86 published in October 1984 by the David Taylor Naval Ship Research and Development Center, entitled "The Fabrication, Processing and Characterization of Multidimensionally Braided Graphite/Epoxy Composite Materials" authored by Aleksander Macander, Roger Crane and Eugene Camponeschi. U.S. Pat. Nos. 3,426,804 issued to Bluck and 4,312,261 to Florentine describe a device for producing a multidimensionally braided preform. Three dimensional braiding is also described in the article "AUTOMATIC THROUGH-THE-THICKNESS BRAIDING" by Richard T. Brown and Eddie C. Crow, Jr of Atlantic Research Corporation, Alexandria, Va., 37th International SAMPE Symposium, Volume 37, pp 832-842, Mar. 9-12, 1992 (hereafter SAMPE article), in which the three-dimensional braiding is capable of automatic fabrication of complex structural shapes such as I-beams, ribs, and blade stiffened panels.

SUMMARY OF THE INVENTION

It is an object of the present invention to provide a load bearing structural support for machinery that is capable of supporting significant loading while providing a mechanism for dissipating both mechanical and vibrational energy. The load bearing structural support of the present invention is capable of carrying significant loads in compression and tension, and even torsion depending the core structure of the support. The present invention can be utilized, for example, to form I-beams, T-beams, suspension supports.

The above object of the invention is achieved in the present invention by forming a structural support with a high damping flexible reinforcement, as disclosed for example in U.S. Pat. No. 4,954,377, comprising a fiber reinforcement, which can be a fabric, a stitched fabric, a braided or multidimensionally braided fiber preform, hereafter denoted as a fiber preform. The fiber preform is infiltrated with a viscoelastic material which has a high elongation to failure property and provides a significant damping ability.

In the first embodiment, one specific configuration contemplated and explicitly shown and described herein is an I-Beam which is formed by three shapes, a T-shape sandwiched between two back-to-back arranged L-shapes.

At least one flexible reinforcement is then positioned between the L- and T-shapes to suspend the T-shape between the L-shapes. Preferably, a plurality of flexible reinforcements are positioned between the L- and T-shapes. More preferably, a plurality of outer tensile and inner compressive flexible reinforcements are alternatingly arranged along the entire longitudinal length of the I-beam to support both tensile and compressive loads.

For supporting compressive loads, the inner compressive flexible reinforcement of a predetermined width, which is substantially less than the length of the I-beam, wraps the top side of the horizontal segment of the left L-shape, runs between the vertical segments of the L-shape and the T-shape, under the bottom of the T-shape, continues between the vertical segment of the T-shape and the right L-shape, over top of the horizontal segment of the L-shape. The compressive reinforcement substantially takes on the form of a M-shape. This flexible reinforcement, then, allows the T-shape to "float", keeping it from being in contact with L-shapes or ultimately the main support structure. Any vibrational motion that occurs on the T-shape is isolated from the L-shapes.

For supporting tensile loads, an outer tensile flexible reinforcement of the predetermined width is positioned contiguous or spaced along the length direction of the I-beam to the inner compressive reinforcement. Specifically, the outer tensile flexible reinforcement is positioned under the horizontal segment of the left L-shape, runs between the vertical segments of the left L-shape and the T-shape, over the horizontal segment of the T-shape, between the vertical segments of the T-shape and the right L-shape, and finally under the horizontal segment of the right L-shape. This outer tensile flexible reinforcement keeps the T-shape from displacing from out between the L-shapes.

Alternatively, in the second embodiment, which is substantially identical to the first embodiment except in the arrangement of the compressive and tensile reinforcements. the inner compressive and the outer tensile reinforcements are overlapingly situated. That is, the inner compressive reinforcement remains same as that of the first embodiment except that the width thereof preferably runs the entire length of the I-beam. Then the outer tensile reinforcement is positioned over the horizontal and vertical segment portions of the left L-shape, runs around the horizontal segment of the T-shape, and finally over the vertical and horizontal segment portions of the right L-shape. In the second embodiment, the outer tensile reinforcement preferably runs the entire length of the I-beam, overlapping portions of the inner compressive reinforcement. Moreover, four bearing plates are attached to the flanges of the horizontal segments of the T- and L-shapes to retain the reinforcements in their place.

Alternatively, in the third embodiment, the flexible reinforcement is shaped flat and is preferably rectangular. In this embodiment, the rectangular flexible reinforcement is positioned over and mechanically fastened to rigid anchors so that a substantial portion of the flexible reinforcement is suspended between the anchors. Machinery is then mechanically fastened to the suspended flexible structure. In this embodiment, the weight of the machinery causes the flexible structure to stretch and deform. This deformation causes the viscoelastic material to undergo a shear deformation. The vibration of machinery then results in additional shear in the viscoelastic resulting in significant dissipation of mechanical vibrations. In order to minimize displacement of the section of flexible structure which supports the machinery, an additional vertical segment of the same flexible reinforcement is attached or formed integral to the suspended flexible reinforcement at its center and the free end thereof is anchored to a fixed base.

Other objects and advantages of the present invention will be better understood from the following description and the accompanying drawings.

BRIEF DESCRIPTION OF THE DRAWINGS

FIG. 2 is a perspective view of a first embodiment of the present invention showing an I-beam with inner compressive flexible and outer compressive flexible reinforcements for supporting both tensile and compressive loads.

FIG. 3 is a cross-sectional view taken along line 3—3 of FIG. 2 showing the inner compressive flexible reinforcement.

FIG. 7 shows the tensile modulus as a function of strain for a ±57° AS4/polyurethane braid.

DETAILED DESCRIPTION OF THE PREFERRED EMBODIMENTS

Figure 1:
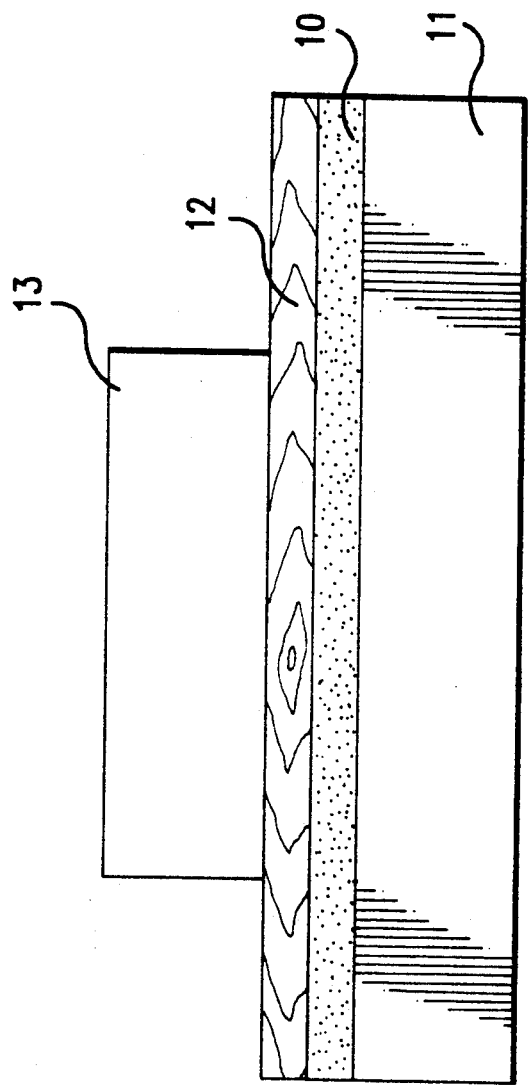
FIG. 1 is a Prior Art constrained layer damping device.

The present invention has been described in terms of three illustrated embodiments. Same or equivalent elements of the embodiments illustrated in the drawings have been identified with same reference numerals.

The embodiments described herein have been contemplated for purposes of illustrating the principles of the present invention. Accordingly, the present invention is not to be limited solely to the exact configuration and construction as illustrated and set forth herein. All expedient modifications readily known to one skilled in the art from the teaching of the present invention, which may be made within the scope and essence of the present invention, are to be included as further embodiments of the present invention.

FIG. 2 shows a first embodiment of the present invention, an I-beam support 20. The I-beam support comprises a plurality of high damping flexible reinforcements 21$t$ and 21$c$ sandwiched between two different shapes, two L shapes, a left shape 22 and a right shape 23 and one T-shape 24, which form the I-beam. The two L-shapes 22, 23 are placed back to back, with the T-shape 24 placed between these two L-shapes, forming an I-beam. Both L- and T-shapes can be made of any conventional structural material, for example, such as metal, plastic, fiberglass, graphite, wood or composite thereof.

The flexible reinforcements 21$t$, 21$c$ are then sandwiched between the vertical segments of the L- and T-shapes and bonded and mechanically fastened to the horizontal segments of the L-shapes 22,23. Preferably, the outer tensile flexible reinforcement 21$t$ and an inner compressive flexible reinforcement 21$c$ are alternatingly placed along preferably the entire longitudinal length of the I-beam to support both tensile and compressive loads. The total widths W of the flexible reinforcements are preferably substantially equal to the length of the I-beam.

For supporting compressive loads, referring to FIG. 3 which shows the cross section of the I-beam taken along the line 3—3, the inner compressive flexible reinforcement 21$c$ of a predetermined width W, which is substantially less than the length of the I-beam, is bonded and mechanically fastened with conventional fastening means 25 such as screws, bolts, clamps, etc., to the top horizontal segments 22$t$ and 23$t$ of the left and right L-shapes. The inner compressive flexible reinforcement 21$c$ is also preferably bonded to the vertical segments 22$v$ and 23$v$ and the top portion 22$p$ and 23$p$ of the left and right L-shapes. However, the inner compressive flexible reinforcement need not be bonded to any of L- and T-shapes at the portion where the reinforcement is sandwiched between the vertical segments the left and right L-shapes and the bottom portion 24b of the T-shape. The inner compressive flexible reinforcement 21c substantially takes on the form of a M-shape, as shown in FIG. 3. It is to be noted that in FIG. 3, the outer tensile flexible reinforcement 21t is not illustrated for purposes of simplifying the drawing and to more clearly illustrates the cross-sectional form of the inner compressive flexible reinforcement.

For supporting tensile loads, the outer tensile flexible reinforcement 21t of the predetermined width is preferably positioned contiguous to the inner compressive flexible reinforcement 21c along the length direction of the I-beam. Specifically, with reference to FIG. 2, the outer tensile flexible reinforcement 21t is bonded and mechanically fastened with conventional fastening means such as screws, bolts, clamps, etc., to the underside portions 22u, 23u of the horizontal segments of the left and right L-shapes. However, the outer tensile flexible reinforcement 21t is preferably not bonded to either of the vertical segments of the L- and T-shapes at the portion where the tensile reinforcement is sandwiched therebetween. Moreover, the tensile reinforcement need not be bonded to the underside segments 24ur and 24ul and the top horizontal segment 24t of the T-shape. This outer tensile flexible reinforcement keeps the T-shape from displacing out between the L-shapes and serves to support tensile loads and dampen shock loads.

Figure 4:
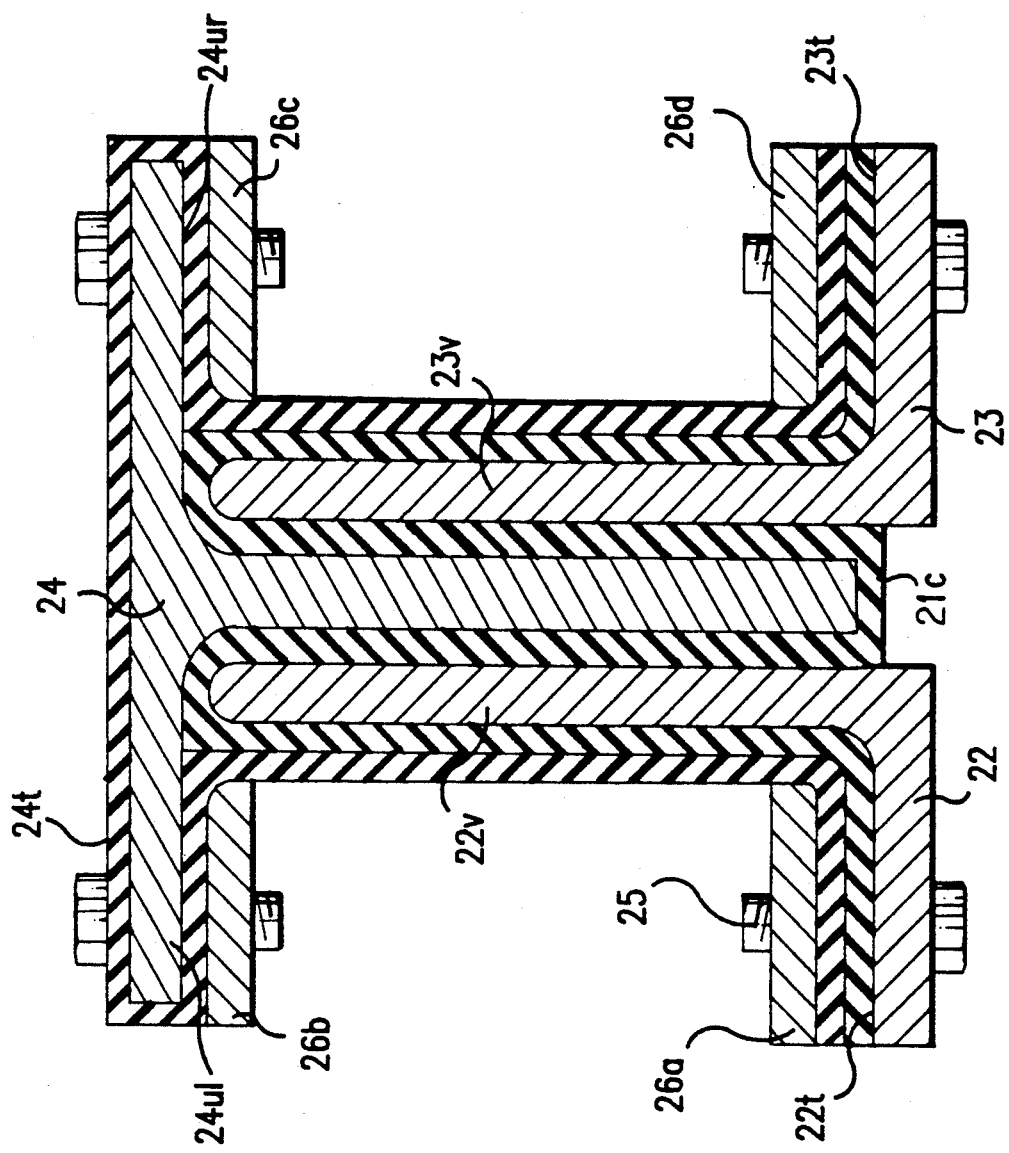
FIG. 4 is a cross-sectional view similar to FIG. 3, but shows a second embodiment of the present invention, where the compressive and tensile reinforcements are placed overlapingly rather than alternatingly.

In the second embodiment, as shown in FIG. 4, the inner compressive flexible reinforcement 21c is identically arranged as that of the first embodiment, except that the width W of the flexible reinforcement preferably runs the entire length of the I-beam. The width W of the outer tensile flexible reinforcement 21t preferably runs the entire length of the I-beam as well. However, it should be noted that each of the compressive and the tensile flexible reinforcement need not be a single piece. In accordance with the present invention, each of the compressive and tensile reinforcements can be a single continuous piece covering the entire length of the I-beam or a plurality of pieces situated contiguous with each other with no spacing therebetween to cover the entire length of the I-beam or spaced from each other along the length of the I-beam as in the first embodiment as long as the compressive and the tensile reinforcements are overlapping. For instance, the compressive reinforcement 21c could be one continuous piece having the width substantially the same the length of the I-beam. Then, a plurality of tensile reinforcements could be placed at spaced intervals over the compressive reinforcement. Conversely, a plurality of compressive reinforcements could be positioned at a spaced intervals along the length of the I-beam. Then, a single continuous piece having the width substantially identical to the length of the I-beam could be placed over the plurality of compressive reinforcements and the I-beam. It is well within the realm of the scope of the present invention to have any variation of combinations of the compressive and tensile reinforcements.

Both the compressive and the tensile reinforcements are preferably bonded and then mechanically fastened with conventional fastening means 25 such as screws, bolts, clamps, etc., to the horizontal segments 22t and 23t of the left and right L-shapes. The tensile reinforcement is mechanically fastened via a conventional fastening means 25 to the underside segments 24ul and 24ur of the horizontal portion 24t of the T-shape. Bearing plates 26a,b,c,d are used to secure and hold the compressive and the tensile reinforcements in place. Specifically, each of the bearing plates could be one continuous piece running the entire length of the I-beam or a plurality of smaller pieces positioned collinearly in spaced relations. The fastening means 25 is positioned through the bearing plates to secure the bearing plates and the compressive and tensile reinforcements to the horizontal segments of the T- and L-shapes. The tensile reinforcement preferably is not bonded to the vertical segments 22v and 23v of the left and right L-shapes and is not bonded to the vertical segment of the inner compressive reinforcement. The compressive reinforcement is also not bonded to the vertical segments 22v and 23v of the left and right L-shapes, but may be bonded thereto if desired to further secure the reinforcements. Moreover, the tensile reinforcement need not be bonded to the underside segments 24ul and 24ur of the horizontal segment 24t of the T-shape, but preferably is bonded thereto.

In the first and second embodiments, both L-shapes are fixed to a stable base via a conventional anchoring device 25 such as bolts, rivets, screws, clamps, etc., to a stable base (not shown). The load is then placed on the T-shape. The flexible reinforcement has two purposes. First, it isolates the T-shape from the L-shapes. Secondly, it dissipates mechanical vibration energy by creating shear in the viscoelastic material from the relative motion of the fibers within the viscoelastic. This configuration can support all compressive and tensile type of loads. These flexible reinforcements also allow the T-shape to "float" between the L-shapes, keeping it from being in contact with the L-shapes. Moreover, machinery or load placed on the I-beam is placed in contact with the flexible reinforcement rather than the I-beam itself to isolate the load from the I-beam. Any vibrational motion that occurs on the T-shape is isolated from the L-shapes and vice-versa.

The energy dissipation occurs by virtue of shear in the viscoelastic elastic material and therefore does not require the flexible reinforcements to be completely bonded to T- and L-shapes, in contrast to the requirements of the Prior Art constraining layer damping device. The flexible reinforcements are merely bonded to portions of the T and L-shapes to maintain the flexible reinforcements from being displaced or moved therebetween. The shearing of the viscoelastic material is the result of the deformation of the reinforcement within the viscoelastic material. This also minimizes the loading on any of the adhesive bond between the viscoelastic material and T- and L-shapes.

Figure 5:
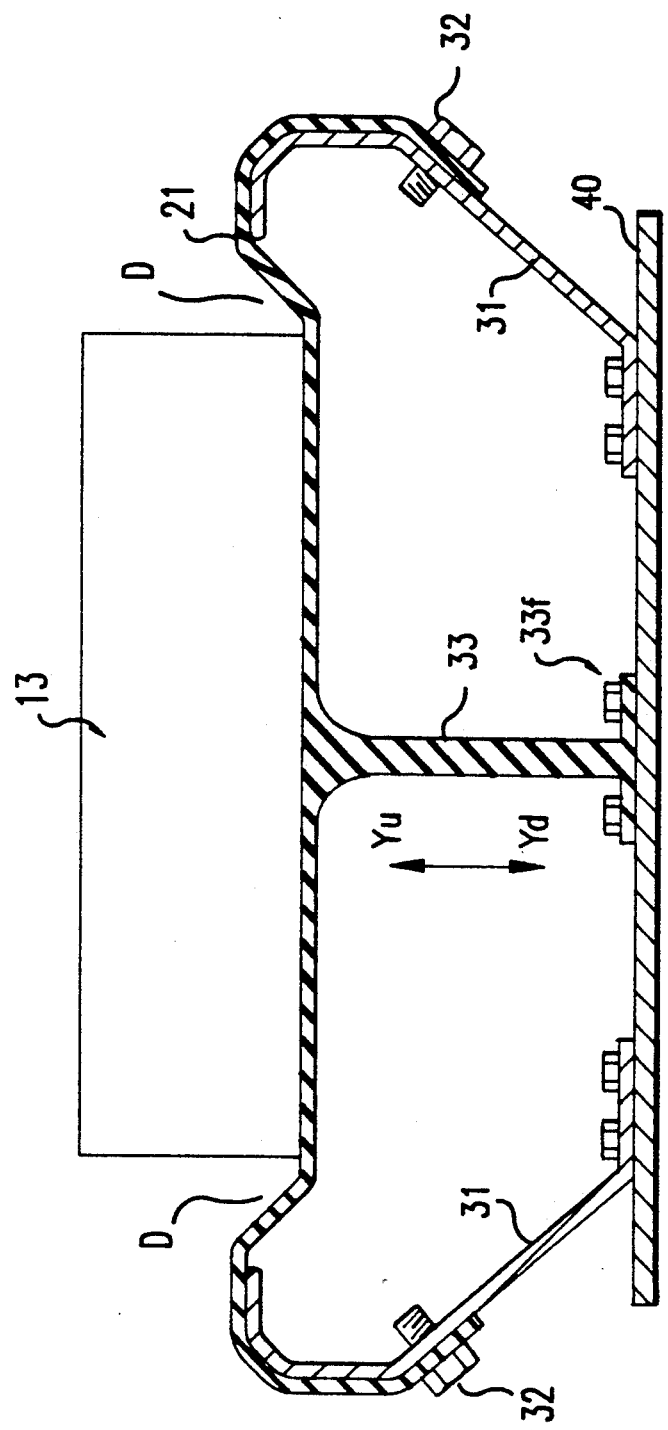
FIG. 5 is a side elevational view of a third embodiment of the present invention shown in a loaded state.
Figure 6:
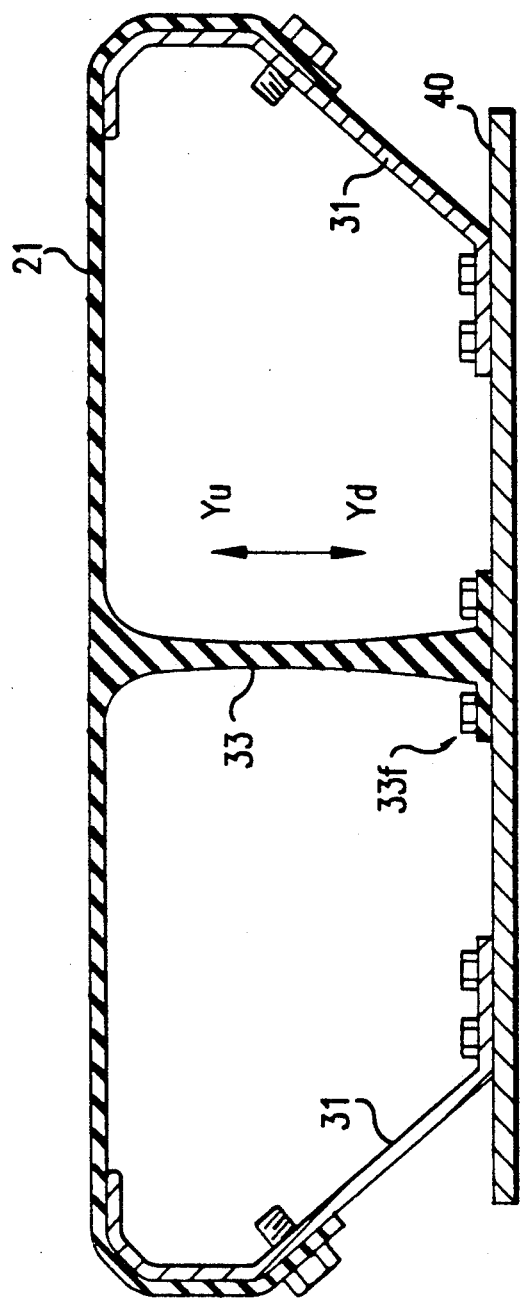
FIG. 6 shows the third embodiment of FIG. 5 in a non-loaded state.

In the third embodiment, as shown in FIGS. 5 and 6, the flexible reinforcement 21 is shaped flat and suspended between rigid anchors 31 which in turn is anchored to a stationary base 40. In this embodiment, preferably a rectangular piece of flexible reinforcement is positioned over and mechanically fastened to the rigid anchors 31 using any conventional fastening means 32 such as bolts and nuts, screws, rivets, clamps, etc. The machinery 13 is then mechanically fastened to the suspended flexible reinforcement by means (not shown) such as bolts and nuts, rivets, screws, clamps, etc.

In this embodiment, due to the flexibility and elasticity of the flexible reinforcement, the weight of the machinery causes the flexible structure to stretch and deform as shown by D in FIG. 5. This deformation causes the viscoelastic material to undergo a shear deformation. The vibration of machinery then results in additional shear in the viscoelastic resulting in significant dissipation of mechanical vibrations.

In order to minimize displacement of the section of flexible reinforcement which supports the machinery 13, a vertical segment 33 made of the same flexible reinforcement is attached to or integrally formed therewith and the free end 33f thereof is anchored to the base 40. This vertical segment 33 is under no tension when loaded. However, upon a shock or vertical loading in the $Y_u$ direction, for example, the vertical segment 33 experiences a tensile load as shown in FIG. 6, allowing for a predetermined vertical displacement of the flexible reinforcement.

FIG. 6 is shown with no load placed thereon. When there is no load, the vertical segment 33 experiences a tensile force. Since the vertical segment is under a tensile force, it will stretch by a prescribed amount and thus the vertical segment is shown having a narrower hourglass like, reduced cross-section. The amount of stretching can be controlled by use of the appropriate braid pattern, well known in the art. Preferably the flexible reinforcement should have a very low initial modulus, but as the material is continued to be loaded, the modulus increases, asymptotically, as shown in the graph of FIG. 7, approaching a stiffness that would be predicted by a rule of mixtures estimate or that which would be achievable with a conventional polymer matrix composite.

The flexible reinforcement contemplated in all of the present embodiments herein comprises a fabric which is stitched, braided or multidimensionally braided, denoted as a fiber preform. The fiber preform has interstrand spaces or interstrand volume which are not occupied by the fibers or strands of the weave or braid. The interstrand spaces of the fiber preform are infiltrated or filled with a viscoelastic material or any material which exhibits molecular interaction when subjected to shearing forces and which has a high elongation to failure property and provides a significant damping ability. The viscoelastic material which can be used in the present flexible reinforcement include rubber such as natural and nitrile rubber, urethane, polyurethane, and other high strain to failure material (strain to failure greater than 60%) and which have a high damping loss factor (greater than 0.1). Generally, the flexible reinforcement is made by making a braided preform which is void of any viscoelastic material, as described in the SAMPE article and U.S. Pat. No. 4,954,377. Once the braid is made in the desired pattern or shape, the voids and gaps between the braids is filled with a rubbery-like viscoelastic material. The fibers forming the braid can move relative to one another when subjected to a load. If a material which has the capability to strain or deform significant amounts, such as "rubbery" material, then the braid will be flexible. The viscoelastic material can be infiltrated into the braid using known Resin Transfer Molding (RTM) Techniques or through press molding, depending on the shape and form of the braided part and then finally cured.

Preferably, the viscoelastic material should fill the interstrand spaces as well as totally encapsulating all strands and fibers which make up the strands forming an intimate chemical, mechanical, or chemical and mechanical bond with the strand in an interconnective network, as described in U.S. Pat. No. 4,954,377, the disclosure of which is incorporated herein by reference, as mentioned previously.

Due to its flexibility, the flexible reinforcement can take on a variety of shapes, including a flat plate-like shape as shown in FIG. 6. Moreover, the present flexible structure is capable of supporting significant loads while providing a mechanism for dissipating both mechanical and vibrational energy. Advantageously, the flexible structure can be shaped into any desired form and does not require the flexible reinforcement to be bonded to the support structure.

What is claimed is:

1. A load bearing structure comprising:
    an I-beam formed by a T-shape, which is formed by a horizontal segment joined by a vertical segment at a substantially mid-section of said horizontal segment, sandwiched between a pair of L-shapes, each having a horizontal segment joined at one end to an end of a vertical segment; and
    at least one flexible reinforcement comprising a flexible textile and a viscoelastic material for damping vibration and shock, said at least one flexible reinforcement being sandwiched between said vertical segment of said T-shape and said vertical segment of said L-shapes, such that said T-shape is isolated from said L-shapes and;
    said flexible reinforcement wraps around said horizontal and vertical segments of said T-shape.

2. A load bearing structure according to claim 1, wherein said flexible reinforcement further wraps portions of said horizontal segments of said L-shapes.

3. A load bearing structure according to claim 1, wherein said flexible reinforcement comprises a multidimensionally braided fiber forming a rectangularly shaped textile, whereby said viscoelastic material is infiltrated into voids or spaces of the braided fiber.

4. A load bearing structure according to claim 3, wherein said viscoelastic material is selected from the group consisting of natural and nitrile rubber, urethane and polyurethane.

5. A load bearing structure comprising:
    an I-beam formed by a T-shape, which is formed by a horizontal segment joined by a vertical segment at a substantially mid-section of said horizontal segment, sandwiched between a pair of L-shapes, each having a horizontal segment joined at one end to an end of a vertical segment;
    at least one flexible reinforcement comprising a flexible textile and a viscoelastic material for damping vibration and shock, said at least one flexible reinforcement being sandwiched between said vertical segment of said T-shape and said vertical segment of said L-shapes, such that said T-shape is isolated from said L-shapes; and
    said flexible reinforcement wraps around said vertical segments of said L-shapes.

6. A load bearing structure according to claim 5, wherein said flexible reinforcement further wraps around portions of said horizontal segments of said L-shapes.

7. A load bearing structure according to claim 5, wherein said flexible reinforcement comprises a multidimensionally braided fiber forming a rectangularly shaped textile, whereby said viscoelastic material is infiltrated into voids or spaces of the braided fiber.

8. A load bearing structure according to claim 7, wherein said viscoelastic material is selected from the group consisting of natural and nitrile rubber, urethane and polyurethane.

9. A load bearing structure comprising:

an I-beam formed by a T-shape, which is formed by a horizontal segment joined by a vertical segment at a substantially mid-section of said horizontal segment, sandwiched between a pair of L-shapes, each having a horizontal segment joined at one end to an end of a vertical segment;

a plurality of least one flexible reinforcements, each comprising a flexible textile and a viscoelastic material for damping vibration and shock, said flexible reinforcements being placed contiguous to each other or spaced apart from each other along the lengthwise direction of said I-beam, each of said flexible reinforcements being sandwiched between said vertical segment of said T-shape and said vertical segments of said L-shapes, such that said T-shape is isolated from said L-shapes; and at least a first one of said flexible reinforcements wraps around said horizontal and vertical segments of said T-shape.

10. A load bearing structure according to claim 9, wherein at least second one of said flexible reinforcements wraps around said vertical and portions of said horizontal segments of said L-shapes, wherein said at least second one being contiguous with said at least first one of said flexible reinforcements.

11. A load bearing structure according to claim 10, wherein said first flexible reinforcement further wraps portions of said horizontal segments of said L-shapes.

12. A load bearing structure according to claim 9, wherein a first plurality of said flexible reinforcements, which are spaced apart from each other in the lengthwise direction of said I-beam, wraps around said horizontal and vertical segments of said T-shape.

13. A load bearing structure according to claim 12, wherein a second plurality of said flexible reinforcements, each formed between and contiguous to two adjacent spaced apart first flexible reinforcement which wraps around said horizontal and vertical segments of said T-shape, wraps around said vertical and portions of said horizontal segments of said L-shapes.

14. A load bearing structure according to claim 13, wherein said first flexible reinforcements each further wraps portions of said horizontal segments of said L-shapes.

15. A load bearing structure according to claim 9, wherein said first flexible reinforcement further wraps portions of said horizontal segments of said L-shapes.

16. A load bearing structure according to claim 9, wherein said flexible reinforcement comprises a multidimensionally braided fiber forming a rectangularly shaped textile, whereby said viscoelastic material is infiltrated into voids or spaces of the braided fiber.

17. A load bearing structure according to claim 16, wherein said viscoelastic material is selected from the group consisting of natural and nitrile rubber, urethane and polyurethane.

18. A load bearing structure comprising:

an I-beam formed by a T-shape, which is formed by a horizontal segment joined by a vertical segment at a substantially mid-section of said horizontal segment, sandwiched between a pair of L-shaped shapes, each having a horizontal segment joined at one end to an end of a vertical segment;

a plurality of flexible reinforcements, each comprising a flexible textile and a viscoelastic material for damping vibration and shock, said flexible reinforcements being placed contiguous to each other or spaced apart from each other along the lengthwise direction of said I-beam, each of said flexible reinforcements being sandwiched between said vertical segment of said T-shape and said vertical segments of said L-shapes, such that said T-shape is isolated from said L-shapes; and at least a first one of said flexible reinforcements wraps around said vertical segments of said L-shapes and wraps around portions of said horizontal segments of said L-shapes.

19. A load bearing structure according to claim 18, wherein a first plurality of said flexible reinforcements, which are spaced apart from each other in the lengthwise direction of said I-beam, wraps around said vertical and portions of said horizontal segments of said L-shapes.

20. A load bearing structure according to claim 19, wherein said first flexible reinforcements each further wraps portions of said horizontal segments of said L-shapes.

21. A load bearing structure according to claim 18, wherein at least one of said flexible reinforcements wraps around said horizontal and vertical segments of said T-shape and further wraps around portions of said horizontal segments of said L-shapes.

22. A load bearing structure according to claim 21, wherein said portions of said second flexible reinforcement overlaps with said first flexible reinforcements.

23. A load bearing structure according to claim 22, wherein the width of said first flexible reinforcement runs the entire length of said I-beam.

24. A load bearing structure according to claim 23, wherein the width of said second flexible reinforcement runs the entire length of said I-beam.

25. A load bearing structure according to claim 22, wherein the width of said second flexible reinforcement runs the entire length of said I-beam.

26. A load bearing structure comprising:

an I-beam formed by a T-shape, which is formed by a horizontal segment joined by a vertical segment at a substantially mid-section of said horizontal segment, sandwiched between a pair of L-shaped shapes, each having a horizontal segment joined at one end to an end of a vertical segment; and at least one first flexible reinforcement, each comprising a flexible textile and a viscoelastic material for damping vibration and shock, said first flexible reinforcement being sandwiched between said vertical segment of said T-shape and said vertical segments of said L-shapes such that said T-shape is isolated from said L-shapes;

at least one second flexible reinforcement, each comprising a flexible textile and a viscoelastic material for damping vibration and shock, said second flexible reinforcement overlapping a portion of said first flexible reinforcement and wrapping said horizontal segment of said T-shape.

27. A load bearing structure according to claim 26, wherein said second flexible reinforcement overlaps said first flexible reinforcement at said vertical segment and horizontal segments of said L-shapes.

* * * * *